(12) United States Patent (10) Patent No.: US 8,745,622 B2
Mewhinney et al. (45) Date of Patent: Jun. 3, 2014

(54) STANDALONE SOFTWARE PERFORMANCE OPTIMIZER SYSTEM FOR HYBRID SYSTEMS

(75) Inventors: Greg R. Mewhinney, Austin, TX (US); Diane Garza Flemming, Pflugerville, TX (US); David B. Whitworth, Austin, TX (US); William A. Maron, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/427,746

(22) Filed: Apr. 22, 2009

(65) Prior Publication Data

US 2010/0275206 A1 Oct. 28, 2010

(51) Int. Cl.
*G06F 9/50* (2006.01)
*G06F 9/48* (2006.01)

(52) U.S. Cl.
CPC ............ *G06F 9/5033* (2013.01); *G06F 9/4843* (2013.01); *G06F 9/50* (2013.01)
USPC ............ 718/100; 718/102; 718/103; 718/104

(58) Field of Classification Search
None
See application file for complete search history.

(56) References Cited

U.S. PATENT DOCUMENTS

| | | | | |
|---|---|---|---|---|
| 5,826,079 A | * | 10/1998 | Boland et al. | 718/102 |
| 5,872,972 A | * | 2/1999 | Boland et al. | 718/102 |
| 6,269,390 B1 | * | 7/2001 | Boland | 718/100 |
| 6,289,369 B1 | * | 9/2001 | Sundaresan | 718/103 |
| 6,658,448 B1 | * | 12/2003 | Stefaniak et al. | 718/104 |
| 6,735,613 B1 | * | 5/2004 | Jean-Dominique et al. | 718/104 |
| 7,039,911 B2 | | 5/2006 | Chase et al. | |
| 7,159,216 B2 | | 1/2007 | McDonald | |
| 7,222,343 B2 | | 5/2007 | Heyrman et al. | |
| 7,275,249 B1 | * | 9/2007 | Miller et al. | 718/105 |
| 7,287,254 B2 | * | 10/2007 | Miller et al. | 718/102 |
| 7,389,506 B1 | * | 6/2008 | Miller et al. | 718/1 |
| 7,584,476 B2 | * | 9/2009 | Chung et al. | 718/104 |
| 7,941,805 B2 | * | 5/2011 | Dillenberger et al. | 718/105 |
| 7,996,696 B1 | * | 8/2011 | Haney et al. | 713/324 |
| 8,051,418 B1 | * | 11/2011 | Dice | 718/102 |
| 8,108,875 B2 | * | 1/2012 | Dillenberger et al. | 718/104 |
| 8,108,877 B2 | * | 1/2012 | Dillenberger et al. | 718/105 |
| 2004/0068730 A1 | * | 4/2004 | Miller et al. | 718/106 |
| 2007/0067606 A1 | * | 3/2007 | Lin et al. | 712/10 |
| 2008/0046895 A1 | * | 2/2008 | Dillenberger et al. | 718/105 |
| 2008/0126751 A1 | * | 5/2008 | Mizrachi et al. | 712/30 |
| 2008/0134185 A1 | | 6/2008 | Fedorova | |
| 2008/0178192 A1 | * | 7/2008 | Dillenberger et al. | 718/105 |
| 2008/0216087 A1 | * | 9/2008 | Dillenberger et al. | 718/105 |
| 2010/0017804 A1 | * | 1/2010 | Gupta et al. | 718/102 |
| 2010/0077185 A1 | * | 3/2010 | Gopalan et al. | 712/220 |

\* cited by examiner

*Primary Examiner* — Qing Wu
(74) *Attorney, Agent, or Firm* — James L. Baudino (57) ABSTRACT

Standalone software performance optimizer systems for hybrid systems include a hybrid system having a plurality of processors, memory operably connected to the processors, an operating system including a dispatcher loaded into the memory, a multithreaded application read into the memory, and a static performance analysis program loaded into the memory; wherein the static performance analysis program instructs at least one processor to perform static performance analysis on each of the threads, the static performance analysis program instructs at least one processor to assign each thread to a CPU class based on the static performance analysis, and the static performance analysis program instructs at least one processor to store each thread's CPU class. An embodiment of the invention may also include the dispatcher optimally mapping threads to processors using thread CPU classes and remapping threads to processors when a runtime performance analysis classifies a thread differently from the static performance analysis.

23 Claims, 4 Drawing Sheets

STANDALONE SOFTWARE PERFORMANCE OPTIMIZER SYSTEM FOR HYBRID SYSTEMS

BACKGROUND

The present invention relates to a standalone software performance optimizer system for hybrid systems. Hybrid systems are a new and still evolving type of computer system. For the purpose of this invention, a hybrid system refers to a general purpose computer with the characteristic that it houses 2 or more types of Central Processing Unit (CPU), each with different performance characteristics. For example, a hybrid system may contain processors geared for encryption/decryption, processors designed for floating point performance, or multiple general purpose processors with different levels of performance. Further, it is possible that these different types of CPUs may all be usable by a single operating system image. The possibility that an operating system might have access to different types of CPUs optimized for different types of operations presents many challenges to the operating system, some of which are addressed by this invention.

In the case of a multithreaded application which consists of at least two, and likely many, software threads, it is the operating system's responsibility to dispatch the threads to CPUs in an optimal way. This is a challenge on a hybrid system because conventionally the operating system has no understanding of the individual characteristics of a software thread. Therefore, the operating system lacks the information it needs to know the best type of processor upon which each thread should be dispatched. This invention assists the operating system in classifying threads and making optimal dispatch decisions.

A known solution to classifying threads would be to employ established performance analysis techniques including static code analysis, runtime profile analysis, and timed statistics analysis. The drawback to these approaches is that these solutions require source code, performance analysis expertise, and time. To speed the adoption of new hybrid hardware configurations and save money, a new solution is needed.

SUMMARY

One embodiment of the present invention is a method of optimizing software performance for hybrid systems. An embodiment of the invention may also include providing a hybrid system having a plurality of processors, memory operably connected to the processors, and an operating system including a dispatcher loaded into the memory; reading an application binary into the memory and performing static performance analysis on each of the threads by at least one of the processors; assigning each thread to a CPU class based on the static performance analysis; and storing each thread's CPU class. An embodiment of the invention may also include loading the application into the memory; providing the dispatcher with each thread's CPU class; optimizing thread dispatch by the dispatcher using each thread's CPU class by selecting a processor from the plurality of processors, wherein the selected processor's characteristics are best suited for the dispatched thread's particular requirements; performing runtime performance analysis on running threads by at least one of the processors; assigning each thread to a CPU class based on the runtime performance analysis; comparing each thread's CPU class based on the runtime performance analysis to each thread's CPU class based on the static performance analysis; responsive to determining a thread's CPU class based on the runtime performance analysis does not match the thread's CPU class based on the static performance analysis, providing the thread's CPU class based on the runtime performance analysis to the dispatcher; and reoptimizing thread dispatch by the dispatcher using each thread's CPU class based on the runtime performance analysis by selecting a processor from the plurality of processors, wherein the selected processor's characteristics are best suited for the dispatched thread's particular requirements.

According to one embodiment of the present invention, a standalone software performance optimizer system for hybrid systems includes a hybrid system having a plurality of processors, memory operably connected to the processors, an operating system including a dispatcher loaded into the memory, an application including a binary and having a plurality of threads read into the memory, and a static performance analysis program loaded into the memory; wherein the static performance analysis program instructs at least one processor to perform static performance analysis on each of the threads; wherein the static performance analysis program instructs at least one processor to assign each thread to a CPU class based on the static performance analysis; and wherein the static performance analysis program instructs at least one processor to store each thread's CPU class. An embodiment of the invention may also include a runtime performance analysis program loaded into the memory; wherein the dispatcher is provided with each thread's CPU class when the application is loaded into the memory; wherein the dispatcher optimizes thread dispatch using each thread's CPU class by selecting a processor from the plurality of processors, wherein the selected processor's characteristics are best suited for the dispatched thread's particular requirements; wherein the runtime performance analysis program instructs at least one processor to perform runtime performance analysis on running threads; wherein the runtime performance analysis program instructs at least one processor to assign each thread to a CPU class based on the runtime performance analysis; wherein the runtime performance analysis program instructs at least one processor to compare each thread's CPU class based on the runtime performance analysis to each thread's CPU class based on the static performance analysis; wherein responsive to determining a thread's CPU class based on the runtime performance analysis does not match the thread's CPU class based on the static performance analysis, the runtime performance analysis program instructs at least one processor to provide the thread's CPU class based on the runtime performance analysis to the dispatcher; and wherein the dispatcher reoptimizes thread dispatch using each thread's CPU class based on the runtime performance analysis by selecting a processor from the plurality of processors, wherein the selected processor's characteristics are best suited for the dispatched thread's particular requirements.

One embodiment of the present invention is a computer program product for that optimizing software performance for hybrid systems. An embodiment of the invention may also include first program instructions to read an application including a binary by a hybrid system having a plurality of processors, memory operably connected to the processors, and an operating system including a dispatcher loaded into the memory into the memory, wherein the application has a plurality of threads; second program instructions to perform static performance analysis on each of the threads by at least one of the processors; third program instructions to assign each thread to a CPU class based on the static performance analysis; and fourth program instructions to store each thread's CPU class. An embodiment of the invention may also include fifth program instructions to load the application into the memory; sixth program instructions to provide the dispatcher with each thread's CPU class as established by the static performance analysis; seventh program instructions to optimize thread dispatch by the dispatcher using each thread's CPU class by selecting a processor from the plurality of processors, wherein the selected processor's characteristics are best suited for the dispatched thread's particular requirements; eighth program instructions to perform runtime performance analysis on running threads by at least one of the processors; ninth program instructions to assign each thread to a CPU class based on the runtime performance analysis; tenth program instructions to compare each thread's CPU class based on the runtime performance analysis to each thread's CPU class based on the static performance analysis; eleventh program instructions to provide the thread's CPU class based on the runtime performance analysis to the dispatcher responsive to determining a thread's CPU class based on the runtime performance analysis does not match the thread's CPU class based on the static performance analysis; and twelfth program instructions to re-optimize thread dispatch by the dispatcher using each thread's CPU class based on the runtime performance analysis by selecting a processor from the plurality of processors, wherein the selected processor's characteristics are best suited for the dispatched thread's particular requirements.

DETAILED DESCRIPTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable mediums may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium may even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc. The medium may be remote to the user, thus allowing the use of the program over a large area computer network, including a global network such as the Internet.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), whether via wireless, wireline or other transmission means.

An embodiment of the present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
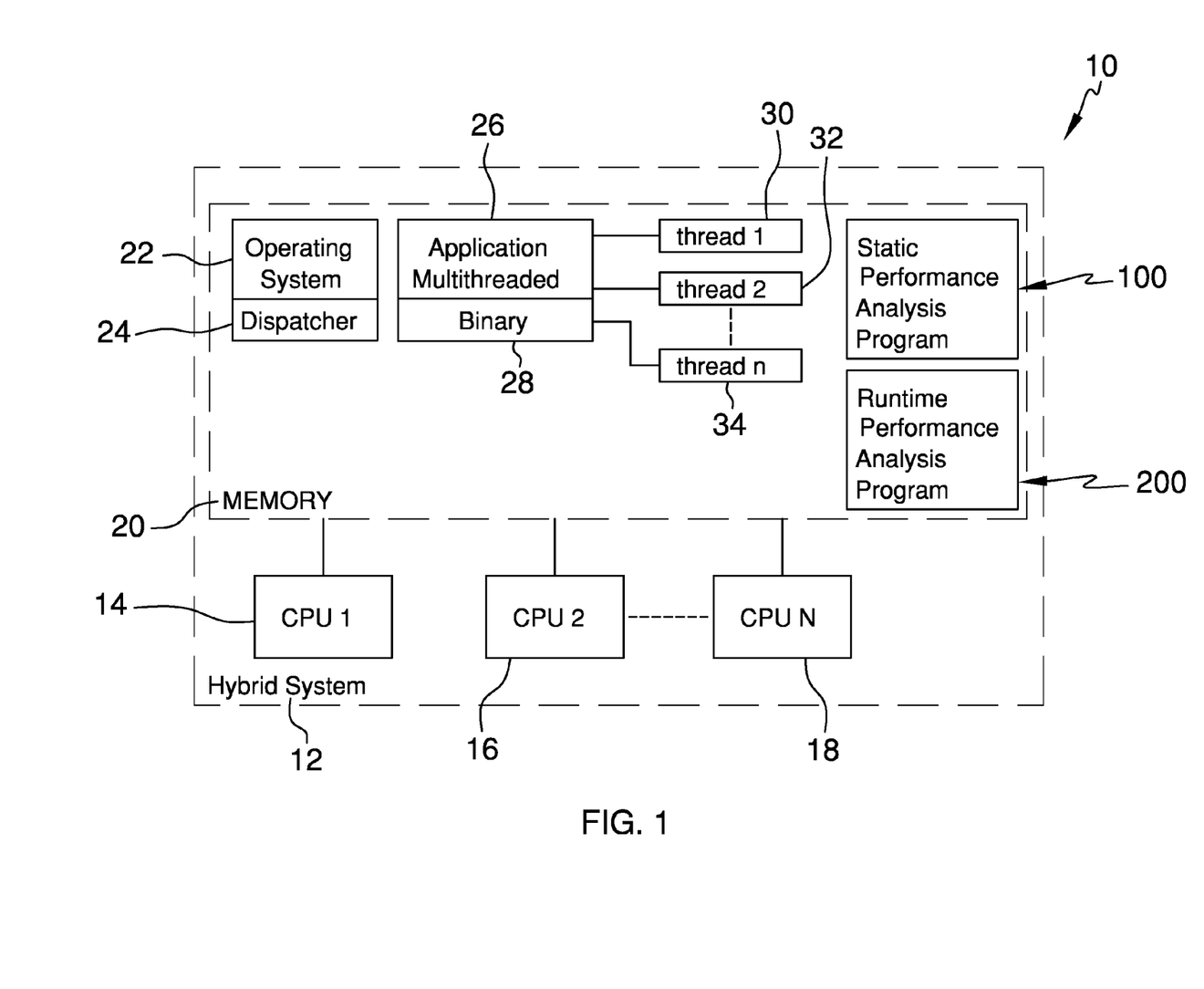
FIG. 1 is a schematic view of an embodiment of a standalone software performance optimizer system for hybrid systems constructed in accordance with the principles of the present invention.

Referring now to FIG. 1, an embodiment of the standalone software performance optimizer system for hybrid systems 10 is illustrated. More particularly, the embodiment of the system 10 includes a hybrid system 12 with multiple CPUs 14-18 and a memory module 20 operably connected to the CPUs. Loaded into the memory module are an operating system 22 with a dispatcher 24, an application 26 including a binary 28 and multiple threads 30-34, a static performance analysis program 100, and a runtime performance analysis program 200. The dispatcher controls the assignment of threads to the CPUs. The static performance analysis program and the runtime performance analysis program collect data about the threads and provide classification information to the dispatcher. Each analysis program contains a set of programmatic instructions that instruct at least one of the CPUs how to analyze the application's threads. The resulting information enables the dispatcher to identify which type of CPU is best suited to run each thread. At runtime, the dispatcher will map the thread classes onto available CPU resources so that whenever possible a thread is dispatched to the most optimal CPU type available.

Although three CPUs and three application threads are depicted in the current embodiment, any quantity greater than one CPU and one thread can be present. The CPUs may be of any type, including general-purpose CPUs, CPUs optimized for encryption/decryption, or CPUs designed for floating-point performance, provided that at least one CPU has at least one performance characteristic that differs from at least one of the other CPUs.

Figure 2:
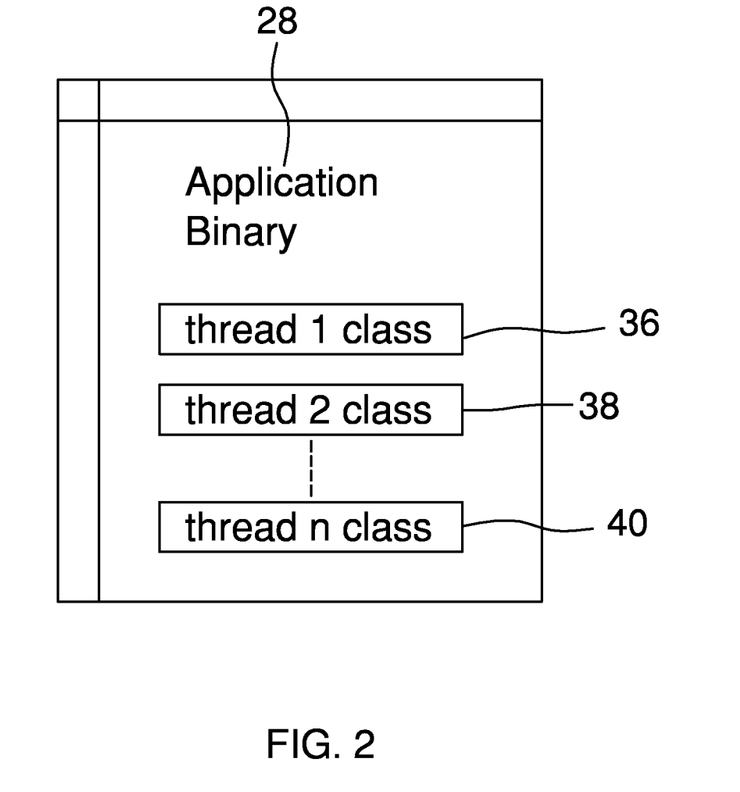
FIG. 2 is a schematic view of an embodiment of an application binary of the present invention.

Referring now to FIG. 2, an embodiment of the application binary 28 is illustrated. More particularly, the application binary 28 is modified by the static performance analysis program and runtime performance analysis program to store thread classification data 36-40 for each thread. This could take the form of changing the thread library create calls to pass the classes to the operating system or modifying the binaries' loader information to provide this information to the operating system.

Figure 3:
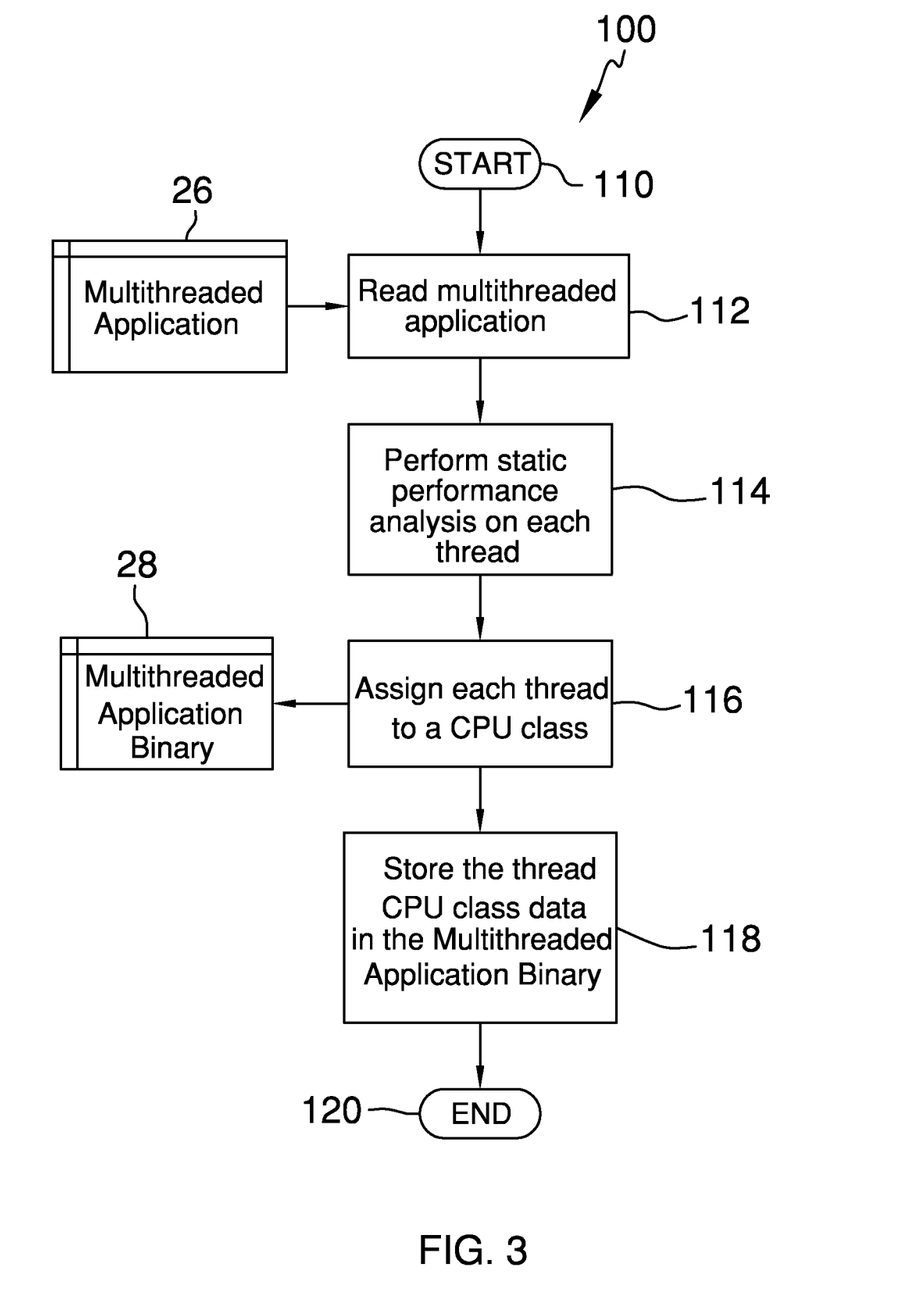
FIG. 3 is a flow chart of an embodiment of a static performance analysis program of the present invention.

Referring now to FIG. 3, an embodiment of the static performance analysis program 100 is illustrated. The flowchart of the program begins (110) by reading the application's binary (112). Subsequently, static performance analysis is performed on each of the application's threads (114) to assign each thread to a CPU class (116). A static analysis of a code block identifies what type of instructions it contains. This is accomplished by the static performance analysis program disassembling and interpreting the contents of the application's binary. For example, the presence of instructions that may be native on one type of processor but emulated on another (encryption, floating point) would aid in optimal assignment of a thread to available CPU resources. So would identification of the thread's instruction mix: load/store vs. branchy vs. heavy floating point computations. Another form of static analysis would be to look at the frequency of well-known library calls that may perform better on a particular processor. For example, a thread that makes many calls into an encryption library routine would best be classified as belonging to the class "encryption." Such a thread would run most efficiently on a CPU designed for encryption. After assigning each thread to a CPU class, each thread's CPU class data is stored in the application's binary (118) before the program ends (120). The thread classes that exist are determined by the available hardware. A class itself would be described in an architecture specification. The operating system provides a complete list of available thread classes to any application that asks. In the application, one place to modify the binary would be at the thread creation point. In a threaded application using, for example, the thread libraries, thread creation is managed by a library call. This linkage between the thread create and the library routine could be modified to link to an appropriate thread class specific version of thread create.

Figure 4:
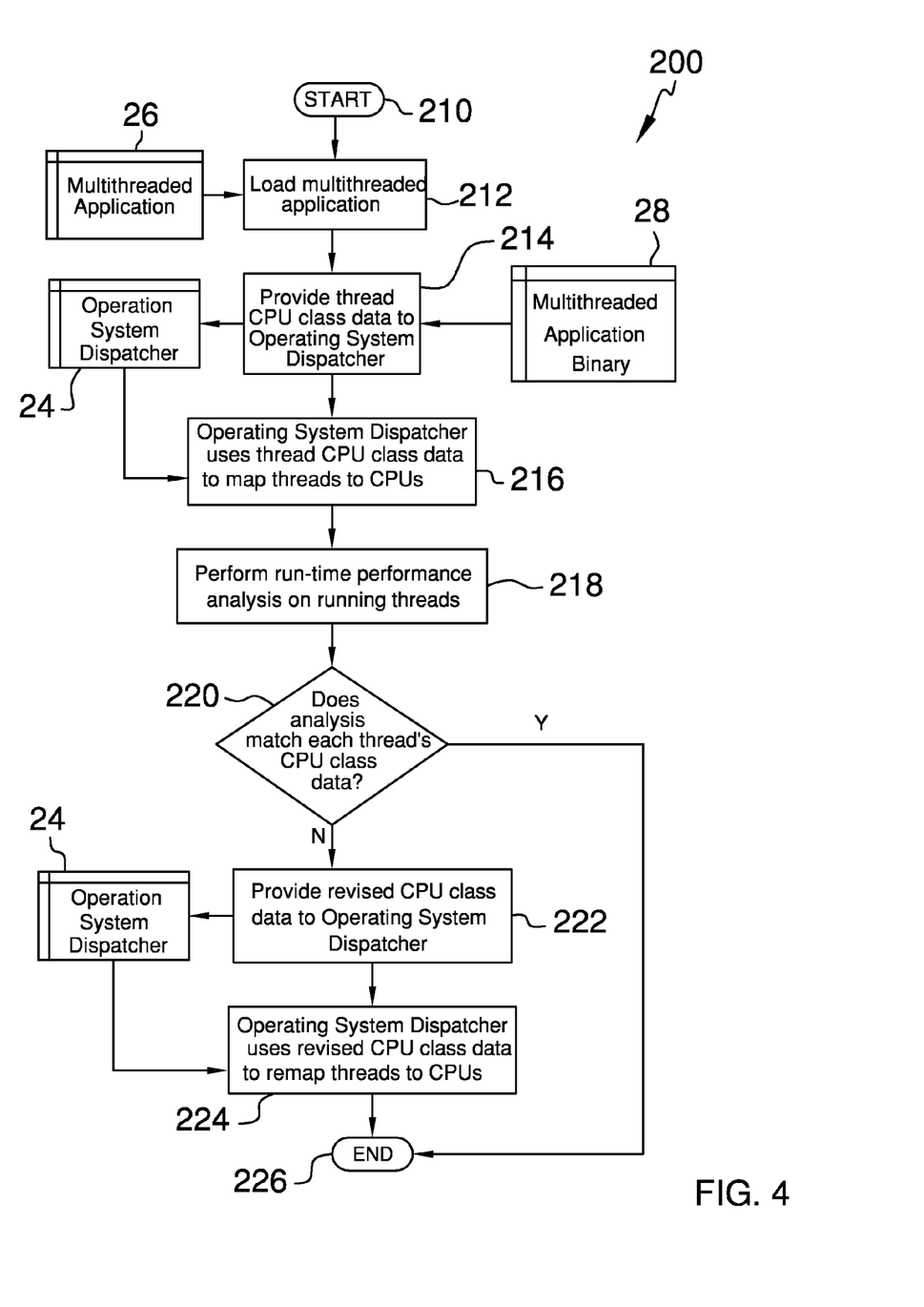
FIG. 4 is a flow chart of an embodiment of a runtime performance analysis program using runtime performance analysis of the present invention.

Referring now to FIG. 4, an embodiment of the runtime performance analysis program 200 is illustrated. The flowchart of the program begins (210) by loading the application (212). Subsequently, the application's threads' CPU class data is provided to the dispatcher from the application's binary (214). The dispatcher uses the thread CPU class data to map threads to the CPUs (216). Runtime performance analysis is then performed on running threads (218). To perform runtime analysis, a standard practice would be to instrument the binary and collect data from the instrumentation as the binary executes a sample workload. The instrumentation typically takes the form of counters that are inserted in the code to count how many times a particular code block is executed. The runtime analysis of how many times a thread executes a given block, combined with static analysis of that block, can indicate how to classify a thread. Another type of runtime analysis would be a time-based profile. This identifies where a thread spends most of its time, and therefore what blocks of code are most critical.

Another sort of runtime analysis would be to use built-in processor instrumentation, such as a performance monitor. This uncovers the memory characteristics of each thread. For example, a thread that has a small memory working set would best be scheduled on a CPU with a large on-chip cache. The cache is a smaller, faster memory which stores copies of the data from the most frequently used main memory locations. As long as most memory accesses are cached memory locations, the average latency of memory accesses will be closer to the cache latency than to the latency of main memory. Additional runtime performance analysis could include the thread's total CPU time used, combined lock cross-section (time spent holding software locks), and other synchronization tasks performed by the thread.

After using runtime performance analysis to identify a thread's CPU class, the thread's CPU class data as determined by static performance analysis is checked to see if it matches the runtime performance analysis classification (220). If it does, no further action is taken, and the program ends (226). If it does not, the dispatcher is provided with the revised thread CPU class data obtained by the runtime performance analysis (222), and the threads are remapped to CPU resources (224) before the program ends (226). Optionally, the revised thread CPU class data obtained by the runtime performance analysis can be stored in the application's binary and replace the thread's CPU class data as determined by static performance analysis before the program ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of optimizing software performance for hybrid systems comprising:
   providing a hybrid system having a plurality of processors, memory operably connected to the processors, and an operating system including a dispatcher loaded into the memory;
   reading an application including a binary into the memory, wherein the application has a plurality of threads;
   performing static performance analysis on each of the threads by at least one of the processors, the static performance analysis comprising analyzing the threads to identify types of instructions the threads contain;
   assigning each thread to a CPU class based on the static performance analysis; and
   storing each thread's CPU class.

2. The method of claim 1, further comprising:
   loading the application into the memory;
   providing the dispatcher with each thread's CPU class as established by the static performance analysis;
   optimizing thread dispatch by the dispatcher using each thread's CPU class by selecting a processor from the plurality of processors, wherein the selected processor's characteristics are best suited for the thread's particular requirements;
   performing runtime performance analysis on running threads by at least one of the processors;
   assigning each thread to a CPU class based on the runtime performance analysis;
   comparing each thread's CPU class based on the runtime performance analysis to each thread's CPU class based on the static performance analysis;
   responsive to determining a thread's CPU class based on the runtime performance analysis does not match the thread's CPU class based on the static performance analysis, providing the thread's CPU class based on the runtime performance analysis to the dispatcher; and
   reoptimizing thread dispatch by the dispatcher using each thread's CPU class based on the runtime performance analysis by selecting a processor from the plurality of processors, wherein the selected processor's characteristics are best suited for the thread's particular requirements.

3. The method of claim 1, wherein each thread's CPU class is stored in the binary.

4. The method of claim 1, wherein the processors are selected from the group comprising general-purpose processors, processors designed for encryption/decryption, and processors designed for floating point performance.

5. The method of claim 1, wherein at least one of the processors has at least one performance characteristic that differs from at least one of the other processors.

6. The method of claim 1, further comprising disassembling and interpreting contents of the binary to determine the CPU class to assign each thread.

7. The method of claim 1, further comprising modifying the binary to link each thread to a respective CPU class.

8. The method of claim 1, further comprising identifying each thread's instruction mix to determine the CPU class to assign each thread.

9. A standalone software performance optimizer system for hybrid systems comprising:
   a hybrid system having a plurality of processors, memory operably connected to the processors, an operating system including a dispatcher loaded into the memory, an application including a binary and having a plurality of threads read into the memory, and a static performance analysis program loaded into the memory;
   wherein the static performance analysis program instructs at least one processor to perform static performance analysis on each of the threads, the static performance analysis comprising analyzing the threads to identify types of instructions the threads contain;
   wherein the static performance analysis program instructs at least one processor to assign each thread to a CPU class based on the static performance analysis; and
   wherein the static performance analysis program instructs at least one processor to store each thread's CPU class.

10. The system of claim 9, further comprising:
    a runtime performance analysis program loaded into the memory;
    wherein the dispatcher is provided with each thread's CPU class when the application is loaded into the memory;
    wherein the dispatcher optimizes thread dispatch using each thread's CPU class by selecting a processor from the plurality of processors, wherein the selected processor's characteristics are best suited for the thread's particular requirements;
    wherein the runtime performance analysis program instructs at least one processor to perform runtime performance analysis on running threads;
    wherein the runtime performance analysis program instructs at least one processor to assign each thread to a CPU class based on the runtime performance analysis;
    wherein the runtime performance analysis program instructs at least one processor to compare each thread's CPU class based on the runtime performance analysis to each thread's CPU class based on the static performance analysis;

wherein responsive to determining a thread's CPU class based on the runtime performance analysis does not match the thread's CPU class based on the static performance analysis, the runtime performance analysis program instructs at least one processor to provide the thread's CPU class based on the runtime performance analysis to the dispatcher; and wherein the dispatcher reoptimizes thread dispatch using each thread's CPU class based on the runtime performance analysis by selecting a processor from the plurality of processors, wherein the selected processor's characteristics are best suited for the thread's particular requirements.

11. The system of claim 9, wherein each thread's CPU class is stored in the binary.

12. The system of claim 9, wherein the processors are selected from the group comprising general-purpose processors, processors designed for encryption/decryption, and processors designed for floating point performance.

13. The system of claim 9, wherein at least one of the processors has at least one performance characteristic that differs from at least one of the other processors.

14. A computer program product for optimizing software performance for hybrid systems comprising:
 a computer readable storage medium;
 first program instructions to read an application including a binary by a hybrid system having a plurality of processors, memory operably connected to the processors, and an operating system including a dispatcher loaded into the memory into the memory, wherein the application has a plurality of threads;
 second program instructions to perform static performance analysis on each of the threads by at least one of the processors, the static performance analysis comprising analyzing the threads to identify types of instructions the threads contain;
 third program instructions to assign each thread to a CPU class based on the static performance analysis; and
 fourth program instructions to store each thread's CPU class.

15. The computer program product of claim 14, further comprising:
 fifth program instructions to load the application into the memory;
 sixth program instructions to provide the dispatcher with each thread's CPU class as established by the static performance analysis;
 seventh program instructions to optimize thread dispatch by the dispatcher using each thread's CPU class by selecting a processor from the plurality of processors, wherein the selected processor's characteristics are best suited for the thread's particular requirements;
 eighth program instructions to perform runtime performance analysis on running threads by at least one of the processors;
 ninth program instructions to assign each thread to a CPU class based on the runtime performance analysis;
 tenth program instructions to compare each thread's CPU class based on the runtime performance analysis to each thread's CPU class based on the static performance analysis;
 eleventh program instructions to provide the thread's CPU class based on the runtime performance analysis to the dispatcher responsive to determining a thread's CPU class based on the runtime performance analysis does not match the thread's CPU class based on the static performance analysis; and
 twelfth program instructions to re-optimize thread dispatch by the dispatcher using each thread's CPU class based on the runtime performance analysis by selecting a processor from the plurality of processors, wherein the selected processor's characteristics are best suited for the thread's particular requirements.

16. The computer program product of claim 14, wherein each thread's CPU class is stored in the binary.

17. The computer program product of claim 14, wherein the processors are selected from the group comprising general-purpose processors, processors designed for encryption/decryption, and processors designed for floating point performance.

18. The computer program product of claim 14, wherein at least one of the processors has at least one performance characteristic that differs from at least one of the other processors.

19. A method of optimizing software performance for hybrid systems comprising:
 providing a hybrid system having a plurality of processors, memory operably connected to the processors, and an operating system including a dispatcher loaded into the memory;
 reading an application including a binary into the memory, wherein the application has a plurality of threads;
 performing static performance analysis on each of the threads by at least one of the processors;
 assigning each thread to a CPU class based on the static performance analysis;
 storing each thread's CPU class;
 modifying the binary to link each thread to a respective CPU class; and
 modifying a linkage between a thread creation point and a library routine to link each respective thread to a respective CPU class.

20. A method of optimizing software performance for hybrid systems comprising:
 providing a hybrid system having a plurality of processors, memory operably connected to the processors, and an operating system including a dispatcher loaded into the memory;
 reading an application including a binary into the memory, wherein the application has a plurality of threads;
 performing static performance analysis on each of the threads by at least one of the processors;
 assigning each thread to a CPU class based on the static performance analysis;
 storing each thread's CPU class; and
 determining a frequency of library calls of each thread to determine the CPU class to assign each thread.

21. A method of optimizing software performance for hybrid systems comprising:
 providing a hybrid system having a plurality of processors, memory operably connected to the processors, and an operating system including a dispatcher loaded into the memory;
 reading an application including a binary into the memory, wherein the application has a plurality of threads;
 performing static performance analysis on each of the threads by at least one of the processors;
 assigning each thread to a CPU class based on the static performance analysis;
 storing each thread's CPU class;
 loading the application into the memory;

providing the dispatcher with each thread's CPU class as established by the static performance analysis;
optimizing thread dispatch by the dispatcher using each thread's CPU class by selecting a processor from the plurality of processors, wherein the selected processor's characteristics are best suited for the thread's particular requirements;
performing runtime performance analysis on running threads by at least one of the processors;
assigning each thread to a CPU class based on the runtime performance analysis;
comparing each thread's CPU class based on the runtime performance analysis to each thread's CPU class based on the static performance analysis;
responsive to determining a thread's CPU class based on the runtime performance analysis does not match the thread's CPU class based on the static performance analysis, providing the thread's CPU class based on the runtime performance analysis to the dispatcher; and
reoptimizing thread dispatch by the dispatcher using each thread's CPU class based on the runtime performance analysis by selecting a processor from the plurality of processors, wherein the selected processor's characteristics are best suited for the thread's particular requirements.

22. A standalone software performance optimizer system for hybrid systems comprising:
a hybrid system having a plurality of processors, memory operably connected to the processors, an operating system including a dispatcher loaded into the memory, an application including a binary and having a plurality of threads read into the memory, and a static performance analysis program loaded into the memory;
wherein the static performance analysis program instructs at least one processor to perform static performance analysis on each of the threads;
wherein the static performance analysis program instructs at least one processor to assign each thread to a CPU class based on the static performance analysis;
wherein the static performance analysis program instructs at least one processor to store each thread's CPU class;
a runtime performance analysis program loaded into the memory;
wherein the dispatcher is provided with each thread's CPU class when the application is loaded into the memory;
wherein the dispatcher optimizes thread dispatch using each thread's CPU class by selecting a processor from the plurality of processors, wherein the selected processor's characteristics are best suited for the thread's particular requirements;
wherein the runtime performance analysis program instructs at least one processor to perform runtime performance analysis on running threads;
wherein the runtime performance analysis program instructs at least one processor to assign each thread to a CPU class based on the runtime performance analysis;
wherein the runtime performance analysis program instructs at least one processor to compare each thread's CPU class based on the runtime performance analysis to each thread's CPU class based on the static performance analysis;
wherein responsive to determining a thread's CPU class based on the runtime performance analysis does not match the thread's CPU class based on the static performance analysis, the runtime performance analysis program instructs at least one processor to provide the thread's CPU class based on the runtime performance analysis to the dispatcher; and
wherein the dispatcher reoptimizes thread dispatch using each thread's CPU class based on the runtime performance analysis by selecting a processor from the plurality of processors, wherein the selected processor's characteristics are best suited for the thread's particular requirements.

23. A computer program product for optimizing software performance for hybrid systems comprising:
a computer readable storage medium;
first program instructions to read an application including a binary by a hybrid system having a plurality of processors, memory operably connected to the processors, and an operating system including a dispatcher loaded into the memory into the memory, wherein the application has a plurality of threads;
second program instructions to perform static performance analysis on each of the threads by at least one of the processors;
third program instructions to assign each thread to a CPU class based on the static performance analysis;
fourth program instructions to store each thread's CPU class;
fifth program instructions to load the application into the memory;
sixth program instructions to provide the dispatcher with each thread's CPU class as established by the static performance analysis;
seventh program instructions to optimize thread dispatch by the dispatcher using each thread's CPU class by selecting a processor from the plurality of processors, wherein the selected processor's characteristics are best suited for the thread's particular requirements;
eighth program instructions to perform runtime performance analysis on running threads by at least one of the processors;
ninth program instructions to assign each thread to a CPU class based on the runtime performance analysis;
tenth program instructions to compare each thread's CPU class based on the runtime performance analysis to each thread's CPU class based on the static performance analysis;
eleventh program instructions to provide the thread's CPU class based on the runtime performance analysis to the dispatcher responsive to determining a thread's CPU class based on the runtime performance analysis does not match the thread's CPU class based on the static performance analysis; and
twelfth program instructions to re-optimize thread dispatch by the dispatcher using each thread's CPU class based on the runtime performance analysis by selecting a processor from the plurality of processors, wherein the selected processor's characteristics are best suited for the thread's particular requirements.

* * * * *